March 1, 1966 H. SPIESS 3,238,404
CLAMPING OF STACKS OF CORE LAMINATIONS FOR ELECTRICAL MACHINES
Filed Feb. 12, 1962
2 Sheets-Sheet 1
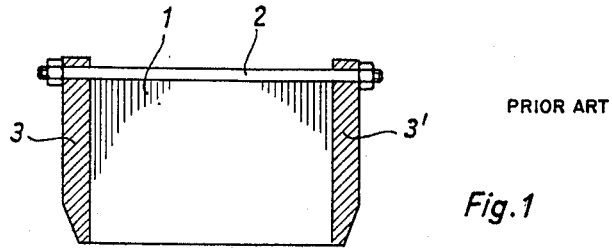
PRIOR ART
*Fig. 1*
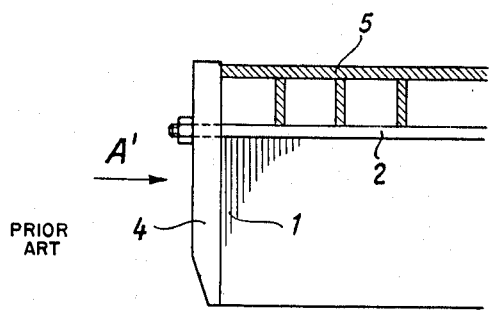 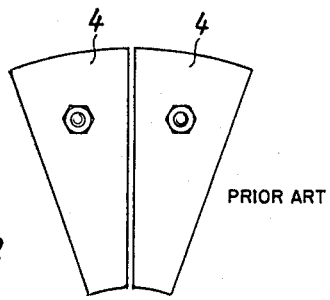
PRIOR ART
*Fig. 3* *Fig. 2*
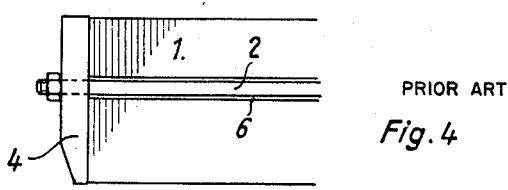
PRIOR ART
*Fig. 4*
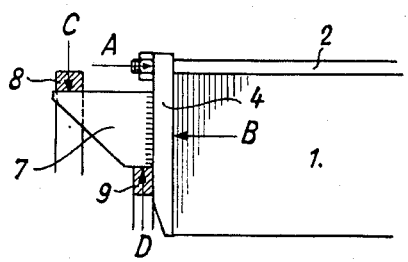 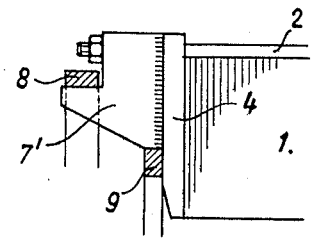
*Fig. 5* *Fig. 6*
INVENTOR:
HANS SPIESS
By Frederick Breitenfeld
ATTORNEY March 1, 1966  H. SPIESS  3,238,404
CLAMPING OF STACKS OF CORE LAMINATIONS FOR ELECTRICAL MACHINES
Filed Feb. 12, 1962  2 Sheets-Sheet 2

INVENTOR:
HANS SPIESS
BY Frederick Breitenfeld
ATTORNEY

United States Patent Office 3,238,404
Patented Mar. 1, 1966

3,238,404
CLAMPING OF STACKS OF CORE LAMINATIONS FOR ELECTRICAL MACHINES
Hans Spiess, Rapperswil, Zurich, Switzerland, assignor to Oerlikon Engineering Company, Zurich, Switzerland, a corporation of Switzerland
Filed Feb. 12, 1962, Ser. No. 172,552
Claims priority, application Switzerland, Feb. 15, 1961, 1,842/61
3 Claims. (Cl. 310—217)

This invention relates to means for clamping stacks of core laminations for electrical machines, particularly for clamping laminated stator cores in large electrical machines FIG. 1 is a cross-sectional view of a conventional relatively small laminated stator;

FIG. 2 is an end view of the stator shown in FIG. 3 looking in the direction of arrow A';

FIG. 3 is a fragmentary cross-sectional view of a relatively large stator;

FIG. 4 is a fragmentary cross-sectional view of another type of relatively large stator;

FIG. 5 is a fragmentary cross-sectional view of a laminated stator according to the present invention;

FIGS. 6 and 7 are views similar to FIG. 5 of alternative embodiments of the present invention;

Figure 7:
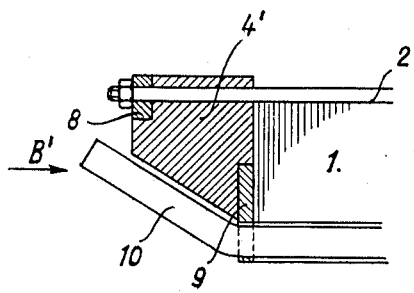

In order to press the laminations of the stator of an electrical machine sufficiently tightly together it is the usual practice to enclose and clamp them between thick end plates. FIGURE 1 of the accompanying drawings illustrates diagrammatically and by way of example a section through such an arrangement in simplified form, and shows a stack of plates 1, held between end plates 3 and 3' by a clamping bolt 2. In smaller machines the end plates may have the shape of closed rings, known as clamping rings, and by suitably designing these rings a substantially evenly distributed pressure can be applied to the stack of laminations. To this end the end plates must be constructed in the manner of dished springs which, when not under load, bear against that part of the stack which is directly adjacent the slots. When the stator diameters are large difficulties arise in production, and the end plates cannot then be made in the form of single components. The usual construction is to divide the end plates into segments, two such end segments 4 being diagrammatically shown in FIGURE 2 of the accompanying drawings which is a fragmentary side elevation of the arrangement in FIGURE 3, seen in the direction of arrow A'. From FIGURE 3 it will be understood that the segments must be supported from a casing 5 if the laminations are to be clamped sufficiently tightly together. This form of construction requires that the length of the casing must be carefully matched with the length of the stack of tightly compressed laminations. Furthermore, the load on the clamping bolts 2 is quite considerable because it acts through a lever arm which is substantially smaller than that of the reactive force of the stack. An arrangement already known to the art is shown diagrammatically in FIGURE 4 of the accompanying drawings which is a view similar to FIGURES 1 and 3, the stack of laminations 1 having transverse holes 6 through which clamping bolts 2 can be passed. Preferably these holes should be located in the centroid of each sheet metal plate, so that the pressure applied to the stack by the clamping bolt will coincide with the reactive force due to the resultant compression. The drawback of this form of construction is that the clamping bolts must be very carefully insulated from the laminations and end plates as otherwise eddy currents and heating effects may give rise to considerable losses.

It is an object of the present invention to overcome these disadvantages.

According to one aspect of the invention there is provided a method of clamping a stack of core laminations between segmental end members in an electrical machine, comprising the steps of applying to said end members a force in a direction parallel to the axis of the core and at the edge thereof thereby resulting in an eccentric reaction force, and applying to said end members balancing forces normal to the axis of the core and to the first-mentioned force.

According to another aspect of the invention there is provided means for clamping a stack of core laminations for an electrical machine, wherein the laminations are disposed between segmental end members which are secured together by means exerting forces in a direction parallel to the axis of the core and at the edge thereof thereby resulting in eccentric reaction forces, and wherein the end members are provided with or comprise extensions projecting away from the core in the longitudinal direction thereof, there being means for exerting on said projections balancing forces normal to the axis of the core and to the first-mentioned forces.

In order to enable the invention to be more readily understood simplified embodiments thereof will now be described by way of example with reference to FIGURES 5 to 10 of the accompanying diagrammatic drawings, in which the same reference numerals are used as in the preceding figures to indicate similar parts.

As will be seen by reference to FIGURE 5 supporting members 7 which project as far as is possible in the axial direction are secured to the segmental end plate 4, force A due to the clamping bolt which force extends parallel to the axis of the core and at the edge thereof, and the resulting eccentric reaction force B due to the compression of the stack are balanced by providing, at a point suitably remote from the stack 1, an inwardly directed radial force C and, at a point closely adjacent the stack, an outwardly directed radial force D. The force C can be easily provided by encircling the lateral supports 7 of the segments with a straining or girth ring 8, while the force D can be generated by a ring 9 which is subject to compression. However, if the several segments fit precisely together and support one another in the manner of a vaulted arch the inner ring could be omitted.

In the embodiment shown in FIGURE 6 the supporting member 7' is shaped somewhat differently from the corresponding member 7 in FIGURE 5, the clamping bolt being arranged to pass through both the end plate and the support.

Figure 8:
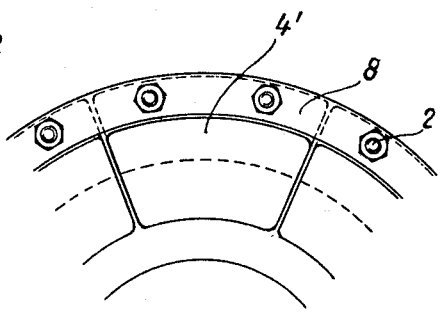
FIG. 8 is an end view of the stator of FIG. 7 looking in the direction of arrow B'.

FIGURES 7 and 8 show a stack of laminations 1, in which the member extending longitudinally from the stack is formed by appropriately thickening and shaping the end plate 4' itself. The segments are also so formed that they can be used for supporting and securing the end connections 10 of the stator winding. The same also applies to the segment supports in the previous embodiments.

Figure 9:
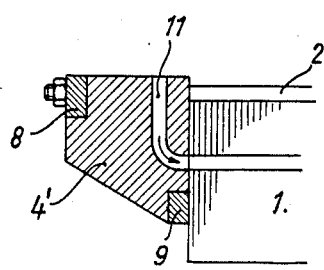
FIGS. 9 and 10 are views similar to FIG. 5 of additional alternative embodiments of this invention.

As shown in FIGURE 9 the segmental end plates 4' may be provided with channels 11 for conducting a coolant, particularly for axially ventilating the laminer body 1.

Figure 10:
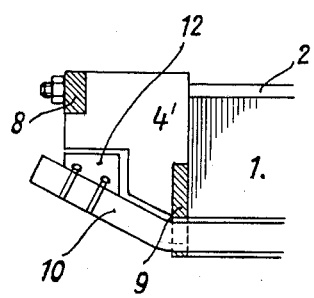

In FIGURE 10 the end connections 10 of the stator winding are secured to an insertion 12 which is axially slidable. The winding is thus free to expand in relation to the core lamination, a particular advantage in the case of very long turbo-generators.

In connection with the leakage fields of the end connections it is a matter of importance to make the segmental end plates of an electrically low loss material, such as wood, a synthetic plastic and so forth. Finally, it may be advisable to make the inner supporting ring 9 of copper, aluminum or the like in order to screen the stack of laminations from the leakage field at the stator ends.

What is claimed is:

1. In an electrical machine, a stator core comprising a stack of laminations, a plurality of independent clamping segments at each end of the stack arranged in an annular pattern, tie bolts extending adjacent to the outer periphery of the stack and between corresponding clamping segments at opposite ends of the stack, a projection extending axially from each segment and having a bearing surface facing radially outwardly and axially spaced from the stack, and a ring concentric with said core and engaging all of said bearing surfaces for applying a radially inward force to each of said bearing surfaces.

2. In an electrical machine, the arrangement defined in claim 1 including a bearing surface on each segment facing radially inwardly and located adjacent to the stack, and a ring concentric with said core and engaging all of said inwardly-facing bearing surfaces for applying a radially outward force to each of said inwardly-facing bearing surfaces.

3. In an electrical machine, the arrangement defined in claim 1 wherein said clamping segments are arranged in side-by-side touching relationship so as to mutually support one another in the circumferential direction.

References Cited by the Examiner

UNITED STATES PATENTS

| | | | |
|---|---|---|---|
| 491,970 | 2/1893 | Meston | 310—218 X |
| 1,123,085 | 12/1914 | Brown | 310—260 |
| 1,403,179 | 1/1922 | Marschke | 310—217 X |
| 1,477,773 | 12/1923 | Schou et al. | 310—217 X |
| 1,661,135 | 2/1928 | Knight | 310—217 X |
| 1,685,054 | 9/1928 | Hibbard | 310—217 X |
| 1,685,742 | 9/1928 | George | 310—217 X |
| 2,636,137 | 4/1953 | Andrus | 310—260 X |
| 2,653,208 | 9/1953 | Ballman | 310—217 X |
| 2,703,849 | 3/1955 | Worth | 310—218 |

ORIS L. RADER, *Primary Examiner.*

MILTON O. HIRSHFIELD, *Examiner.*